Nov. 5, 1929.  A. F. BROTZ  1,734,557
AUTOMATIC GENERATING PLANT
Filed Oct. 5, 1925   3 Sheets-Sheet 3
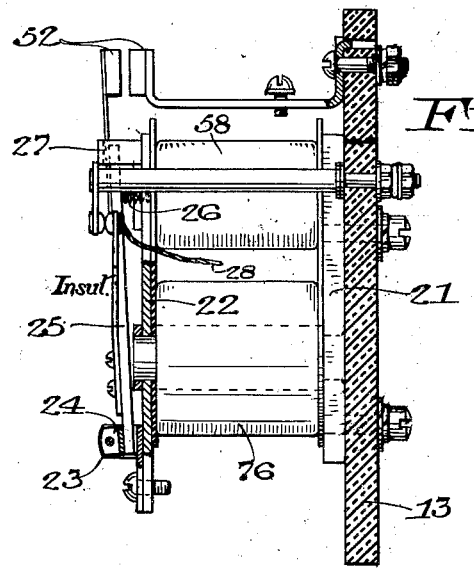
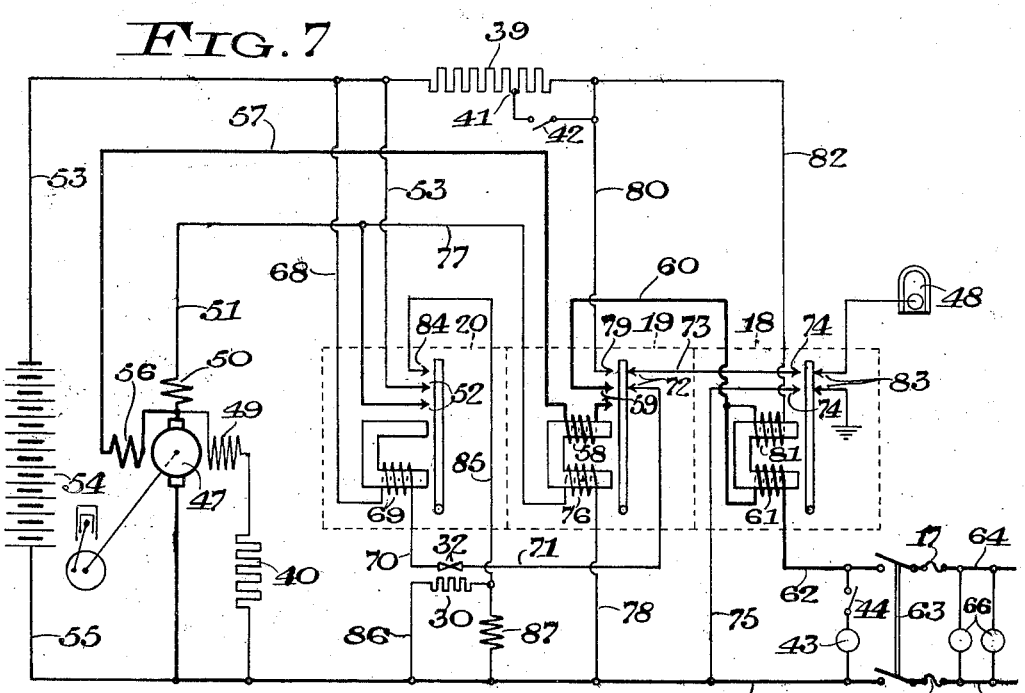
WITNESSES
INVENTOR
Anton Frank Brotz
By R. C. Caldwell
ATTORNEY Patented Nov. 5, 1929

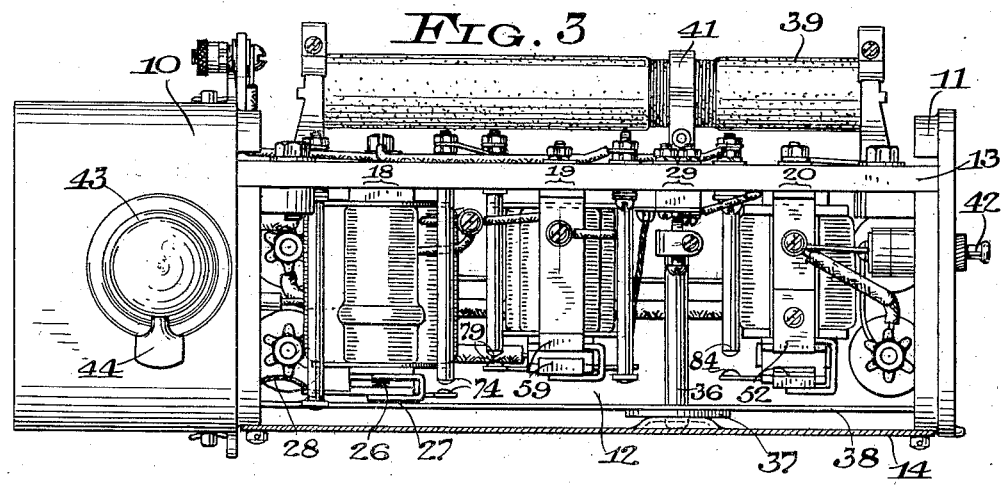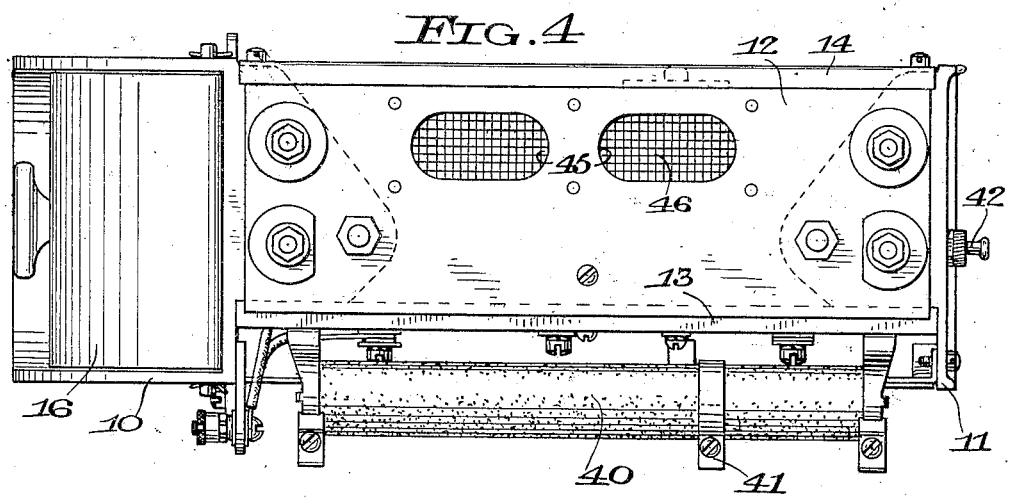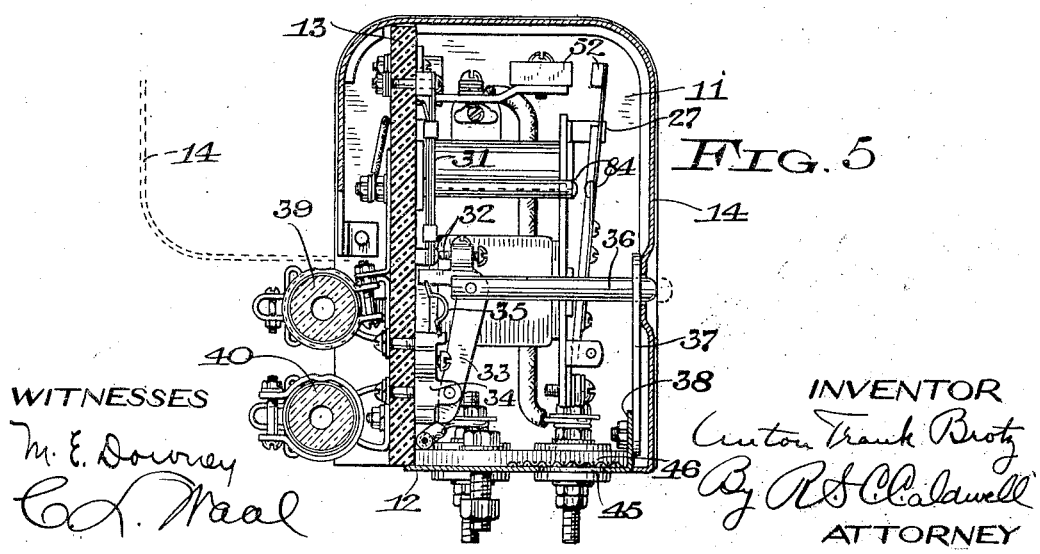

1,734,557

UNITED STATES PATENT OFFICE

ANTON FRANK BROTZ, OF KOHLER, WISCONSIN, ASSIGNOR TO KOHLER COMPANY, OF KOHLER, WISCONSIN, A CORPORATION OF WISCONSIN

AUTOMATIC GENERATING PLANT

Application filed October 5, 1925. Serial No. 60,702.

This invention relates to gas-engine-operated generating units of the demand starter type and has for its object to improve the automatic switch mechanism thereof so as to avoid destructive arcing as upon the occurrence of an overload or short circuit on the mains.

Heretofore an overload or short circuit on the mains reduced the speed of the unit to a point at which connections were made for cranking the engine and then with the motor assisting the engine a slightly increased speed was attained to a point at which the cranking circuit was interrupted, whereupon this cycle of operation was repeated indefinitely or until thermostatic protective devices became effective, the intermittent action with repeated disconnection of the generator from the line serving to prevent the protective fuses from blowing. The repeated operations of the automatic switching mechanism under these conditions cause destructive arcing with consequent damage to the contacts if not permanent injury to the switches.

The present invention prevents the false-cranking at low speeds and therefore avoids such destructive arcing and continues the generator connection with the line so that the protective fuses have a chance to blow.

This result is accomplished by providing the automatic switch which serves to connect and disconnect the generator with the line with a series coil winding which will serve to retain it in its closed position as long as the generator functions.

Another object of the invention is to provide a thermostatic control switch of novel construction for discontinuing the cranking circuit when cranking is ineffective.

Another object is to provide a trouble lamp circuit as a part of the generator unit capable of being closed while the knife switch is open to indicate in time of trouble that the fault is not with the generating unit.

Another object is to provide a switch for varying the charging rate of the storage battery.

Another object of the invention is to perfect details of construction of the switching mechanism and its housing.

With the above and other objects in view the invention consists in the automatic generator plant as herein claimed and all equivalents.

Referring to the accompanying drawings in which like characters of reference indicate the same parts in different views, Fig. 1 is a front elevation of the switch box containing the switching mechanism of this invention;

Fig. 3 is a plan view with the cover sectioned;

Fig. 4 is a bottom view;

Fig. 5 is a transverse sectional view on the plane of line 5—5 of Fig. 2;

Fig. 6 is a detail sectional view of the generator relay, and

Fig. 7 is a diagram of circuits.

Figure 1:
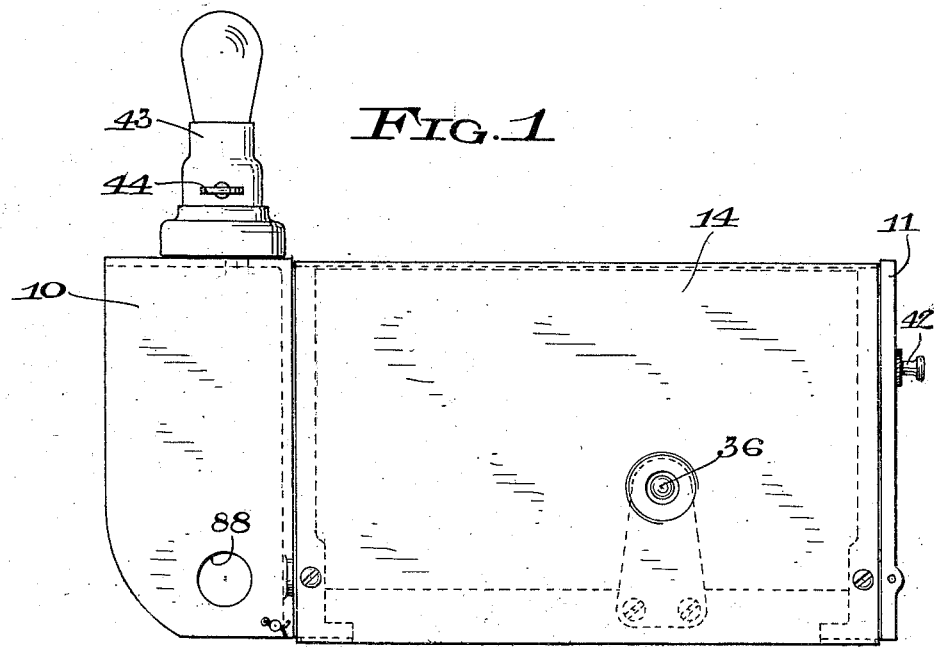
Figure 2:
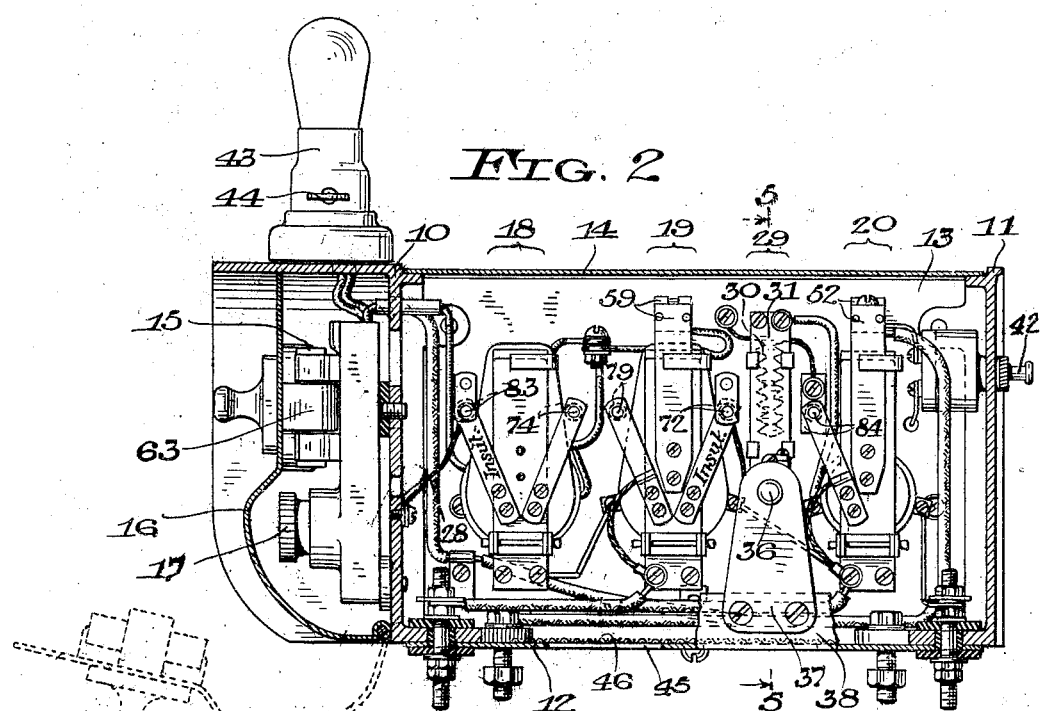
Fig. 2 is a longitudinal sectional view thereof showing in dotted lines the open position of the knife switch.

In these drawings, 10 indicates one end casting and 11 another, the two being connected by a bottom member 12 and supporting between them a panel 13 of slate or other suitable insulating material. The switch-box thus formed is closed by a bent cover plate 14, which is pivotally mounted at the rear of the switch-box to the end castings 10 and 11 so as to be capable of swinging open to expose the switches. The end casting 10 forms a hood or enclosure for a knife switch and fuse block, the knife switch blades 15 being carried by a hinged cover 16 so that the main switch is required to be opened in order to give access to the fuses 17.

Mounted on the panel 13 within the switch-box are three magnetic switches 18, 19 and 20 respectively, the first of which is the control switch for starting and stopping the power plant in the presence or absence of the load, the second is the generator relay for connecting the generator with the line when it functions, and the third is the cranking switch for cranking the engine with the generator operating as a motor. The arrangement of contacts of these switches is such as to effect the connections as shown in the diagram and need not be described in detail. The switches, which are substantially of like construction to minimize replacement parts, will be understood from an inspection of Fig. 6, where it will be seen that the U-shaped magnet core 21 with its coil or coils is mounted on the insulating panel 13 with its ends connected by a plate 22 of non-magnetic material and this plate has secured to it a bracket 23 between the outstanding bent ears of which is pivotally mounted similarly outstanding bent ears 24 of an armature member 25, thus providing a hinge or pivotal support for the armature, which is urged away from the pole-pieces by a coiled spring 26 contained in a recess in one of them and is limited in its outward movement by engagement with a stop 27 mounted on the plate 22. Contacts are carried by the armature to engage stationary contacts mounted on the insulating panel 13. Some of these contacts are mounted on insulating strips as indicated, and others on metal strips having electrical connection with the armature, the contacts on the insulating strips having pigtail leaders 28 and engaging their stationary contacts when the armature is in its outer or released position, as shown in Fig. 6.

A thermostatic switch 29 is provided for automatically opening the cranking circuit after a period sufficient for cranking so as to prevent depletion of the battery when for any reason the engine cannot be cranked, as upon the absence of fuel, and this consists of a heating coil 30 secured to a strip of bi-metallic thermostat metal 31 which is mounted at one end on the insulating panel 13 and at the other end carries a contact 32 to engage a contact 32 carried by a lever 33 mounted on a pivot-block 34 and held in either its closed or its open position by an arched spring 35 engaging said pivot-block and a projection of the lever. This spring serves to hold the lever in either of its positions by having its outer end carried from one side to the other of the line connecting its inner end and the pivotal axis of the lever. A resetting rod 36, serving as an indicator to show by its projection through an opening in the switch cover 14 that the thermostat switch is open, is pivotally mounted on the lever 33 and is guided by passing through an opening in a guide member 37 mounted on the upwardly extending front flange 38 of the bottom member 12.

Mounted on the rear of the insulating panel in suitable supporting clips is a battery-charging resistance element 39 and a field rheostat resistance element 40, both having adjustable tap clips 41 to permit of resistance variation. The resistance of the resistance element 39 between the tap clip and one end thereof is adapted to be short circuited by a charge-varying switch 42, preferably of the push and pull type mounted in the end casting 11.

A trouble lamp 43, preferably controlled by a switch 44 and mounted on the hood of end casting 10 is connected across the generator terminals of the knife switch to constitute a test load for proving that the power plant is in operative condition and so eliminate it from consideration when trouble occurs on the line.

It will be noted that the enclosure for the switch mechanism has tightly fitting parts that make it impossible for insects to gain admission and interfere with the operation of the switches. However, openings 45 may be provided in the bottom plate for ventilation but these are preferably covered with wire screen 46 to exclude the insects.

Referring to the circuit connections of the diagram Fig. 7, 47 indicates the gas-engine-driven generator, the magneto 48 of the gas engine being separated therefrom for convenience. The generator is provided with a shunt field 49 having the resistance element 40 in series therewith.

A series field 50 of the generator, effective when it is operated as a motor for cranking the engine, is connected by wire 51 with one of the motor-starting contacts 52 of the cranking switch 20, the other of said contacts being connected by a wire 53 with one terminal of the storage battery 54, the other terminal of which is connected by a wire 55 with the negative terminal of the generator to complete what is herein referred to as the cranking circuit.

The generator series field 56 is connected by a wire 57 to a series winding 58 of the generator relay 19, the other end of said winding being connected with one of the pair of contacts 59 of said relay, the other of which is connected by a wire 60 with one end of a series winding 61 of the control switch 18, the other end of which is connected by a wire 62 with one blade of the main knife switch 63, which connects it through one of the fuses 17 with one of the line wires 64, the other line wire 65 with the load indicated as lamps 66 between them being similarly connected through one of the fuses 17 and the other blade of the main knife switch with the wire 67 leading to the negative terminal of the generator. This constitutes what is herein referred to as the generator circuit.

A wire 68 leading from the positive battery terminal connects with one end of the winding 69 of the cranking switch 20, the other terminal of which is connected by wire 70 to one of the contacts 32 of the thermostatic switch, the other of said contacts being connected by a wire 71 with one of the pair of contacts 72 of the generator relay 19, the other of which is connected by a wire 73 with one of the pair of contacts 74 of the control switch 18, the other of which contacts is connected by a wire 75 with the negative terminal of the battery, thus completing what is herein referred to as the cranking control circuit.

The other magnet winding 76 of the generator relay 19 forms a voltage coil across the terminals of the generator, but, for convenience, its circuit may be traced from one terminal of the generator through the series field winding 50, wire 51 and wire 77 to said winding 76 and from said winding through wire 78 to the other terminal of the generator.

For recharging the battery, which is preferably of lower voltage than the line voltage, such as a 24 volt battery on a 110 volt unit, there is a circuit controlled by the closing of the generator relay 19, from the positive terminal of the generator through series field 56, wire 57, coil 58, contacts 59 and 79, wire 80, battery-charging resistance 39, wire 53, battery 54, and wire 55, to the negative terminal of the generator. This is herein referred to as the battery-charging circuit and the rate of charge may be varied by the operation of the switch 42, which is connected between the tap clip 41 of the resistance unit 39 and the wire 80 so as to short circuit a part of the resistance.

The other winding 81 of the control switch 18 is of fine wire with many turns and is intended to be energized by the weak flow of current from the low voltage battery through the mains when a load circuit is closed while the generator is idle. The circuit through this winding 81 may be traced from the battery 54 through wire 53, resistance 39, wire 82, winding 81, wire 60, winding 61, wire 62, to line wire 64, and through the load 66 to line wire 65, and by way of wires 67 and 55 to the negative terminal of the battery.

In order that the power plant may cease operating when there is no load on the mains, the magneto 48 of the engine is grounded by a pair of contacts 83 closed by the opening of the control switch 18.

The heating coil 30 of the thermostatic switch for disconnecting the contacts 32 of the cranking circuit when the engine fails to crank within a reasonable time, is in a circuit controlled by the cranking switch 20, which may be traced from the battery through wire 53, contacts 52 and 84, wire 85, heating coil 30 and wires 86 and 55 to the battery. Preferably there is also included in this circuit in parallel with the heating coil 30 a magnet coil 87 for operating a carburetor choke to assist in starting the engine.

In operation, with the power plant at rest, the automatic starting of the unit is accomplished by the closing of any load circuit on the mains. This causes the winding 81 of the control switch 18 to become energized, as above pointed out, to close said control switch, thereby removing the ground from the engine magneto 48 so that it may be operative and closing contacts 74 to establish the circuit through the winding 69 of the cranking switch 20. This causes the cranking switch to close and thereby close the cranking circuit from the battery through the generator, which operates as a motor to start the engine. When the generator functions it energizes the voltage coil 76 of the generator relay 19 and closes the generator relay switch, which first opens the circuit through the cranking switch magnet 69 by disconnecting contacts 72 and then connects the generator with the line by closing contacts 59. This operation also establishes the battery-recharging circuit by connecting contact 59 with contact 79. The generator now supplies the line and, though the cranking switch 20 is open, the generator relay switch 19 and the control switch 18 remain closed, being held so by the action of the series windings 58 and 61 in the generator lead. This condition continues as long as the load remains on the line but as soon as there is no load the current coil 61 releases the armature of the control switch 18, permitting it to close the magneto grounding contacts 18 to stop the engine.

The reliance on current coils in series with the load to retain these two switches closed assures their remaining closed even upon the occurrence of an overload or short circuit, thus preventing the see-sawing and the destructive arcing of these switches, particularly the generator relay switch, the intermittent release of which was incident to the reliance on the voltage coil 76 alone or in conjunction with speed governor control switches.

With this invention an overload or short circuit on the mains does not result in the closing of the cranking circuit as heretofore, but the excessive current flow is maintained until the fuses 17 have a chance to blow and so stop the operation of the power plant.

The presence of the trouble lamp 43 permits the user to satisfy himself that a failure is not due to the power plant, for, by opening the knife switch 63 and closing the trouble lamp switch 44, the power plant will operate as usual, showing that the fault is in the line.

These improvements not only protect the switching mechanism from damage by destructive arcing as the result of improper conditions on the line, but they render unnecessary a great amount of factory service that has heretofore been occasioned by such conditions when the generating unit was not at fault.

By the use of the thermostatic switch a failure of the engine to crank for any reason, as in the absence of fuel, does not deplete the battery by a continuous operation of the generator as a motor, but after a reasonable predetermined time the heating effect of the heat coil 30 causes the thermostat strip 31 to bend and force the lever 33 outwardly against the action of spring 35 until the latter passes over the dead center and throws the lever to its outermost position, opening the contacts 32 and consequently opening the cranking switch 20 to interrupt the cranking circuit. In this position the lever 33 is held by the spring 35 with the rod 36 projecting from the cover of the switch-box to indicate that the thermostatic switch is open. When the defect has been remedied, as by providing a supply of fuel if that was the cause of the failure to crank, the thermostatic switch has to be reset by pressing the rod 36 inwardly to close the contacts 32.

The switch 42 for varying the rate at which the storage battery is recharged permits the battery to be kept in proper condition at all times whether it is used frequently under heavy duty or less frequently with lighter duty.

The switch box structure provides a tight enclosure inaccessible to insects that might interfere with the switch operation, though having screened ventilating openings. The opening 88 in the side of the hood containing the knife switch is for a conduit connection and is therefore closed when the machine is installed.

What I claim as new and desire to secure by Letters Patent is:

1. In a gas-engine-operated generating plant of the demand starter type using the generator for cranking in a low voltage cranking circuit and having a generator relay operated by a voltage coil across the generator terminals to interrupt the cranking circuit, a means for preventing the closing of the cranking circuit by the release of the generator relay upon the occurrence of an overload or short circuit on the mains comprising a magnet coil in series with the mains for holding said generator relay in its closed position.

2. In a gas-engine-operated generating plant of the demand starter type using the generator for cranking in a low voltage cranking circuit and having a generator relay for connecting the generator with the mains when the generator functions and serving to interrupt the cranking circuit, a means for preventing the closing of the cranking circuit and destructive arcing of contacts by repeated operations of the generator relay upon the occurrence of an overload or short circuit on the mains comprising a device sensitive to the flow of current through the mains for holding the generator relay in its closed position.

3. In a gas-engine-operated generator plant of the demand starter type using the generator for cranking in a low voltage cranking circuit and having a generator relay for connecting the generator with the mains when the generator functions and for interrupting the cranking circuit, means for holding the generator relay in its closed position as long as there is a load on the mains and thereby preventing the closing of the cranking circuit upon the occurrence of an overload or a short circuit.

4. In a gas-engine-operated generating plant of the demand starter type using the generator for cranking in a low voltage cranking circuit and having a generator relay operated when the generator functions to connect the generator with fuse-protected mains, means operated by the flow of current to the mains for holding the generator relay in its closed position as long as there is a load on the mains, thereby avoiding the closing of the cranking circuit and permitting the fuses to blow upon the occurrence of an overload or a short circuit on the mains.

5. In a gas-engine-operated generating plant of the demand starter type using the generator for cranking in a low voltage cranking circuit and having a generator relay operated by a voltage coil across the generator terminals for connecting the generator with fused mains and for interrupting the cranking circuit, a means for preventing the release of the generator relay to close the cranking circuit upon the occurrence of an overload or short circuit on the mains with consequent destructive arcing of the contacts of the generator relay comprising a current coil in series with the mains for holding the generator relay in its closed position until the fuses blow.

6. In a gas-engine-operated generating plant of the demand starter type, a generator circuit including service mains and a generator for supplying said mains, a cranking circuit including said generator operating as a motor and a battery of lower voltage than the generator, a generator relay for opening the cranking circuit when the generator functions as a generator, and means for preventing the generator relay from closing the cranking circuit upon the occurrence of an overload or short circuit comprising a magnet coil in the generator circuit for holding said generator relay.

In testimony whereof, I affix my signature.

ANTON FRANK BROTZ.